(12) United States Patent
Yamane

(10) Patent No.: US 10,354,420 B2
(45) Date of Patent: Jul. 16, 2019

(54) INFORMATION PROCESSING APPARATUS AND CONTROL METHOD THEREOF

(71) Applicant: CANON KABUSHIKI KAISHA, Tokyo (JP)

(72) Inventor: Toshimizu Yamane, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 710 days.

(21) Appl. No.: 15/007,751

(22) Filed: Jan. 27, 2016

(65) Prior Publication Data

US 2016/0139749 A1 May 19, 2016

Related U.S. Application Data

(62) Division of application No. 13/188,041, filed on Jul. 21, 2011, now Pat. No. 9,378,569.

(30) Foreign Application Priority Data

Aug. 30, 2010 (JP) ................................ 2010-192710

(51) Int. Cl.
*G06F 3/0482* (2013.01)
*G06T 11/20* (2006.01)
*G06Q 10/10* (2012.01)
*G06F 3/0484* (2013.01)

(52) U.S. Cl.
CPC .......... *G06T 11/206* (2013.01); *G06F 3/0482* (2013.01); *G06F 3/04842* (2013.01); *G06F 3/04847* (2013.01); *G06Q 10/107* (2013.01)

(58) Field of Classification Search
CPC ... G06T 11/206; G06Q 10/107; G06F 3/0481; H04N 7/15
See application file for complete search history.

(56) References Cited

U.S. PATENT DOCUMENTS

| 5,572,728 A * | 11/1996 | Tada ..................... G11B 27/031 |
| 7,447,608 B1 * | 11/2008 | Poston ................ H04L 12/1822 |
| | | 702/177 |
| 2001/0034738 A1 | 10/2001 | Cantwell et al. |
| 2003/0076353 A1 * | 4/2003 | Blackstock ........... G06F 3/0481 |
| | | 715/751 |
| 2006/0047816 A1 * | 3/2006 | Lawton .................. G06Q 10/10 |
| | | 709/227 |

(Continued)

FOREIGN PATENT DOCUMENTS

| CN | 1344397 A | 4/2002 |
| CN | 1619565 A | 5/2005 |

(Continued)

OTHER PUBLICATIONS

Mar. 27, 2015 Japanese Official Action in Japanese Patent Appln. No. 2014-143628.

*Primary Examiner* — Anil K Bhargava
(74) *Attorney, Agent, or Firm* — Venable LLP

(57) ABSTRACT

An information processing apparatus for inputting minutes data comprises an input unit which inputs the minutes data, a designation unit which designates, among a plurality of object images displayed on a display screen, at least one object images to be stored together with the minutes data, and a determination unit which determines, based on the minutes data input by the input unit, the plurality of object images to be displayed on the display screen.

16 Claims, 11 Drawing Sheets

(56) References Cited

U.S. PATENT DOCUMENTS

| | | | |
|---|---|---|---|
| 2006/0200372 A1* | 9/2006 | O'Cull | G06Q 10/06 705/7.22 |
| 2006/0218477 A1* | 9/2006 | Shibata | G06F 17/241 715/201 |
| 2007/0112926 A1* | 5/2007 | Brett | G06Q 10/109 709/206 |
| 2007/0188654 A1* | 8/2007 | Fuse | G09B 5/06 348/375 |
| 2008/0091656 A1* | 4/2008 | Charnock | G06F 16/358 |
| 2009/0094532 A1 | 4/2009 | Lyle et al. | |
| 2009/0158173 A1* | 6/2009 | Palahnuk | G06Q 30/00 715/753 |

FOREIGN PATENT DOCUMENTS

| | | |
|---|---|---|
| CN | 1928859 A | 3/2007 |
| JP | H03-177975 A | 8/1991 |
| JP | H06-215095 A | 8/1994 |
| JP | H08-163524 A | 6/1996 |
| JP | 2004-094833 A | 3/2004 |
| JP | 2005-278786 A | 10/2005 |
| JP | 2006-099414 A | 4/2006 |
| JP | 2008-059010 A | 3/2008 |
| JP | 2009-217653 A | 9/2009 |

* cited by examiner

FIG. 6

Market & Target Analysis Meeting 10:00-12:00, Nov.10, 2010
[Aim] Examine analysis-based area marketing measures
[Goal] Confirm target, task schedule
[Present] Nick Henry, John Casey, Tomo Uchida, Helen Kingston, Anna Johnson Issue1 Market Analysis Results

| | November | December |
|---|---|---|
| Topic1 Report on sales & customer research results | Anna Johnson (348) / John Casey / Helen Kingston | AI 11/22 (350) → AI 12/1 (351) / AI 12/10 (349) |

INFORMATION PROCESSING APPARATUS AND CONTROL METHOD THEREOF

This application is a division of application Ser. No. 13/188,041 filed Jul. 21, 2011.

BACKGROUND OF THE INVENTION

Field of the Invention

The present invention relates to a conference support technique.

Description of the Related Art

Today, when a conference or meeting is held in companies, schools, and research institutions, it is common to summarize the contents of the conference or meeting using a whiteboard. Some whiteboards electronically display and store written contents using a projector and digitizer. These whiteboards are called digital whiteboards or interactive whiteboards, and have become widespread because of their great convenience. In this specification, these electronic whiteboards are simply referred to as whiteboards hereinafter.

To allow ready use of whiteboards, many of them have a function of pasting a half-finished character/graphic object, which is called a template or stencil. Note that a template is a relatively large character/graphic object, and is used to make the whole document conform to a predetermined layout. On the contrary, a stencil is a relatively small character/graphic object, and is used when the user creates an easy-to-understand document by arranging and connecting a plurality of stencils.

Furthermore, a conference support system for summarizing the minutes of a conference and managing an overall conference flow is becoming common. This system and the above whiteboard are often used in combination with each other. Japanese Patent Laid-Open No. 2006-099414 discloses a technique for automatically preparing graphic objects corresponding to conference participants on a whiteboard.

The technique described in Japanese Patent Laid-Open No. 2006-099414, however, does not automatically prepare, from conference information such as conference minutes, character/graphic objects derived from the contents of a conference. The conference participants have to create by handwriting character/graphic objects reflecting the contents of the conference on the whiteboard, which is cumbersome.

Moreover, even if the contents of a character/graphic object are corrected, the conference information such as conference minutes does not reflect the correction. It is, therefore, troublesome for the user to match the contents represented by the conference information with those on the whiteboard.

SUMMARY OF THE INVENTION

The present invention provides a technique for efficiently creating a document in a conference.

According to a first aspect of the present invention, an information processing apparatus for inputting minutes data, comprising: an input unit which inputs the minutes data; a designation unit which designates, among a plurality of object images displayed on a display screen, at least one object images to be stored together with the minutes data; and a determination unit which determines, based on the minutes data input by the input unit, the plurality of object images to be displayed on the display screen.

According to a second aspect of the present invention, a control method for an information processing apparatus for inputting minutes data, comprising: an input step of inputting the minutes data; a designation step of designating, among a plurality of object images displayed on a display screen, at least one object images to be stored together with the minutes data; and a determination step of determining, based on the minutes data input in the input step, the plurality of object images to be displayed on the display screen.

According to a third aspect of the present invention, a non-transitory storage medium storing a computer-readable program executable by a computer for inputting minute data, the program comprising an input step of inputting the minutes data, a designation step of designating, among a plurality of object images displayed on a display screen, at least one object images to be stored together with the minutes data, and a determination step of determining, based on the minutes data input in the input step, the plurality of object images to be displayed on the display screen.

According to a fourth aspect of the present invention, an information processing apparatus for inputting minutes data, comprising: a detection unit which detects that minute data displayed on a first screen of a plurality of screens which displays the minutes data have been changed; and a changing unit which changes minutes data displayed on a second screen of the plurality of screens when the detection unit detects that the minutes data displayed on the first screen have been changed.

According to a fifth aspect of the present invention, a control method for an information processing apparatus for inputting minutes data, comprising: a detection step of detecting that minute data displayed on a first screen of a plurality of screens which displays the minutes data have been changed; and a changing step of changing minutes data displayed on a second screen of the plurality of screens when the minutes data displayed on the first screen is detected to have been changed in the detection step.

According to a sixth aspect of the present invention, a non-transitory storage medium storing a computer-readable program executable by a computer for inputting minutes data, the program comprising a detection step of detecting that minute data displayed on a first screen of a plurality of screens which displays the minutes data have been changed, and a changing step of changing minutes data displayed on a second screen of the plurality of screens when the minutes data displayed on the first screen is detected to have been changed in the detection step.

Further features of the present invention will become apparent from the following description of exemplary embodiments (with reference to the attached drawings).

BRIEF DESCRIPTION OF THE DRAWINGS

FIG. 6 is a view showing an updated whiteboard screen 300;

DESCRIPTION OF THE EMBODIMENTS

Embodiments of the present invention will be described below with reference to the accompanying drawings. The embodiments to be described below are merely examples when the present invention is practically implemented, and are practical examples of an arrangement set forth in the following claims.

The following embodiments assume use in a conference. In addition to the conference, the present invention is applicable to all events using a whiteboard such as a class in a school, a training course, and a research representation.

First Embodiment

Figure 1:
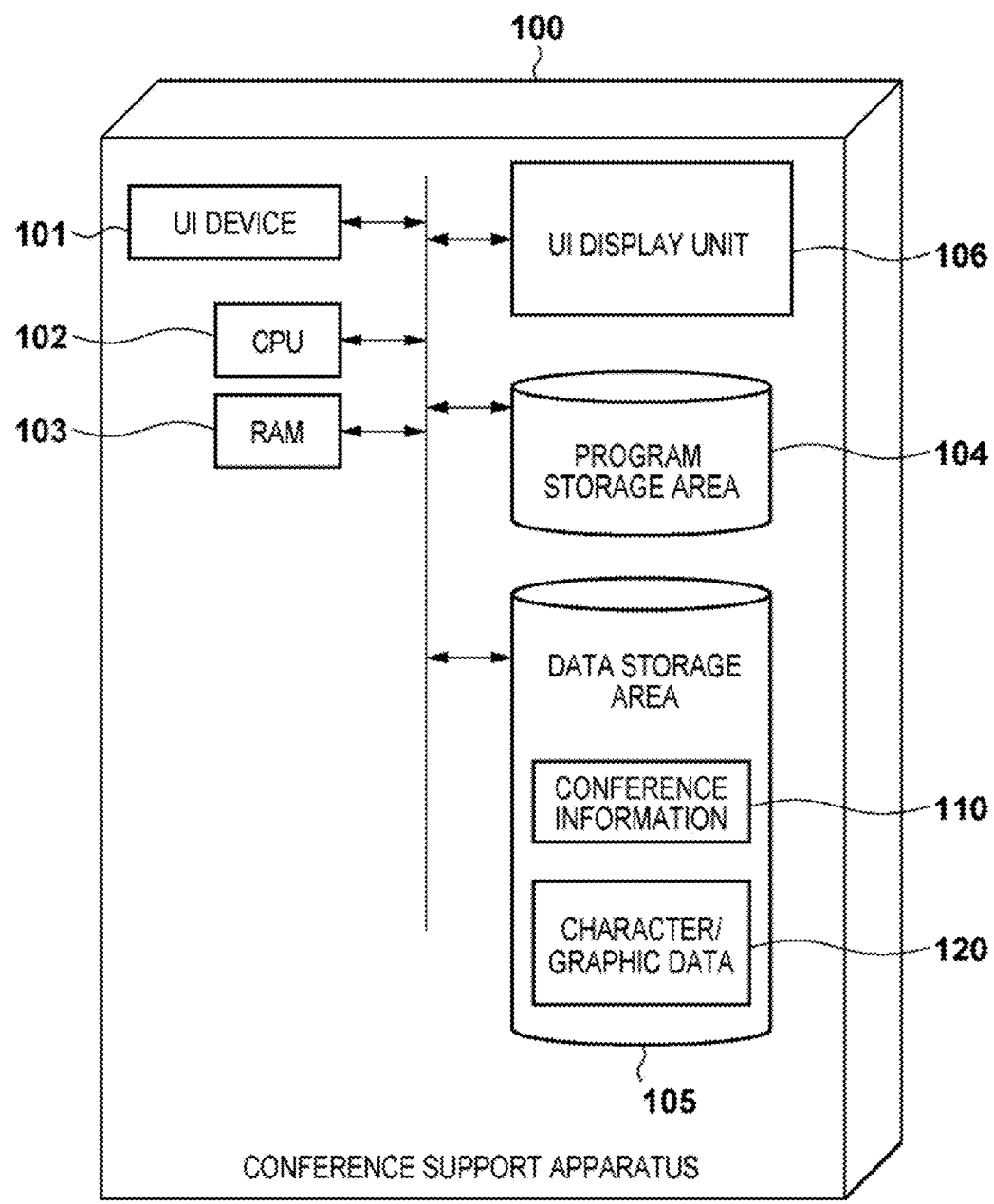
FIG. 1 is a block diagram showing a configuration example of a conference support apparatus 100.

A configuration example of a conference support apparatus 100 serving as an information processing apparatus according to this embodiment will be explained first using a block diagram in FIG. 1. The configuration of the conference support apparatus 100 is not limited to this. Any configuration may be adopted as long as it is possible to execute each process to be described below. Therefore, a functional portion explained as a software component may be implemented by a hardware component and vice versa. Furthermore, for example, the present invention is not limited to a case in which one apparatus has the configuration shown in FIG. 1 but a plurality of apparatuses may constitute the configuration.

A CPU 102 controls the operation of the conference support apparatus 100 as a whole using computer programs and data stored in a RAM 103, and also executes each process which is to be described later by assuming that the conference support apparatus 100 performs it.

The RAM 103 has an area for temporarily storing a computer program loaded from a program storage area 104 and data (conference information 110, character/graphic data 120, and the like) loaded from a data storage area 105. The RAM 103 has a work area used by the CPU 102 to execute various processes. That is, the RAM 103 can provide various areas, as needed.

The program storage area 104 stores a computer program which causes the CPU 102 to execute each process which is to be described later by assuming that the conference support apparatus 100 performs it. Under the control of the CPU 102, the computer program stored in the program storage area 104 is loaded into the RAM 103, as needed.

Figure 9:
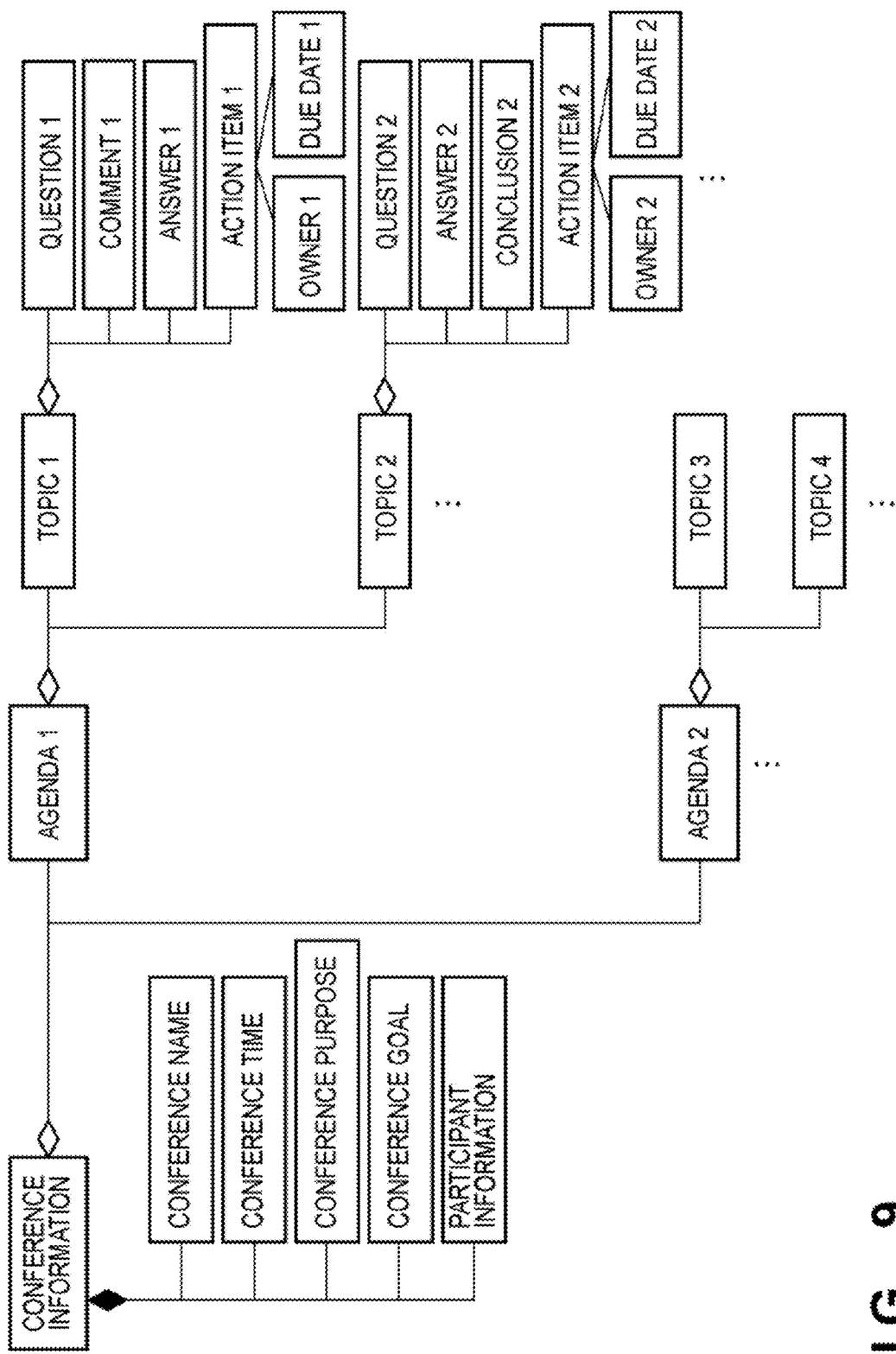
FIG. 9 is a view showing a structure example of conference information 110.

The data storage area 105 stores the conference information 110 and the character/graphic data 120, as described above. The conference information 110 is used to manage elements representing the contents of a conference in a hierarchical structure, as shown in, for example, FIG. 9. The "elements" include information for each conference such as "conference name", "conference time", "conference purpose", "conference goal", and "participant information", and information for each agenda in the conference. The "information for each agenda" is information for each "topic". The information for each "topic" includes "question", "answer", "comment", "conclusion", and "action item". The conference information 110 is minutes data recorded as the minutes of a conference. The configuration of the conference information 110, therefore, is not limited to that shown in FIG. 9 depending on the configuration of the conference minutes.

The character/graphic data 120 include template data and stencil data, and conform to a data format such as SVG (Scalable Vector Graphics). Under the control of the CPU 102, the above-mentioned various data stored in the data storage area 105 are loaded into the RAM 103, as needed.

Each of the program storage area 104 and data storage area 105 serves as, for example, a large-capacity information storage device such as a hard disk drive device. Referring to FIG. 1, the computer programs are stored in a storage device different from that for storing data. However, the program storage area 104 and data storage area 105 may be provided within the same storage device.

The user operates a UI device 101 to input various instructions to the CPU 102. As long as this operation is possible, any apparatus may be used as the UI device 101. For example, a pointing device such as a group of various buttons, a mouse, or a digitizer is applicable to the UI device 101.

A UI display unit 106 includes a CRT or liquid crystal screen, and can display a processing result of the CPU 102 using images and characters. A touch panel display device may be formed by integrating the UI device 101 with the UI display unit 106.

A display example of a conference support UI according to this embodiment which includes a screen (conference minutes screen) for displaying the minutes of a conference indicated by conference information and a whiteboard screen corresponding to this conference minutes screen will be described next with reference to FIG. 2. The conference support UI is displayed on the UI display unit 106. Computer programs associated with the conference support UI are stored in the program storage area 104 and data associated with the conference support UI are stored in the data storage area 105, as a matter of course.

Figure 2:
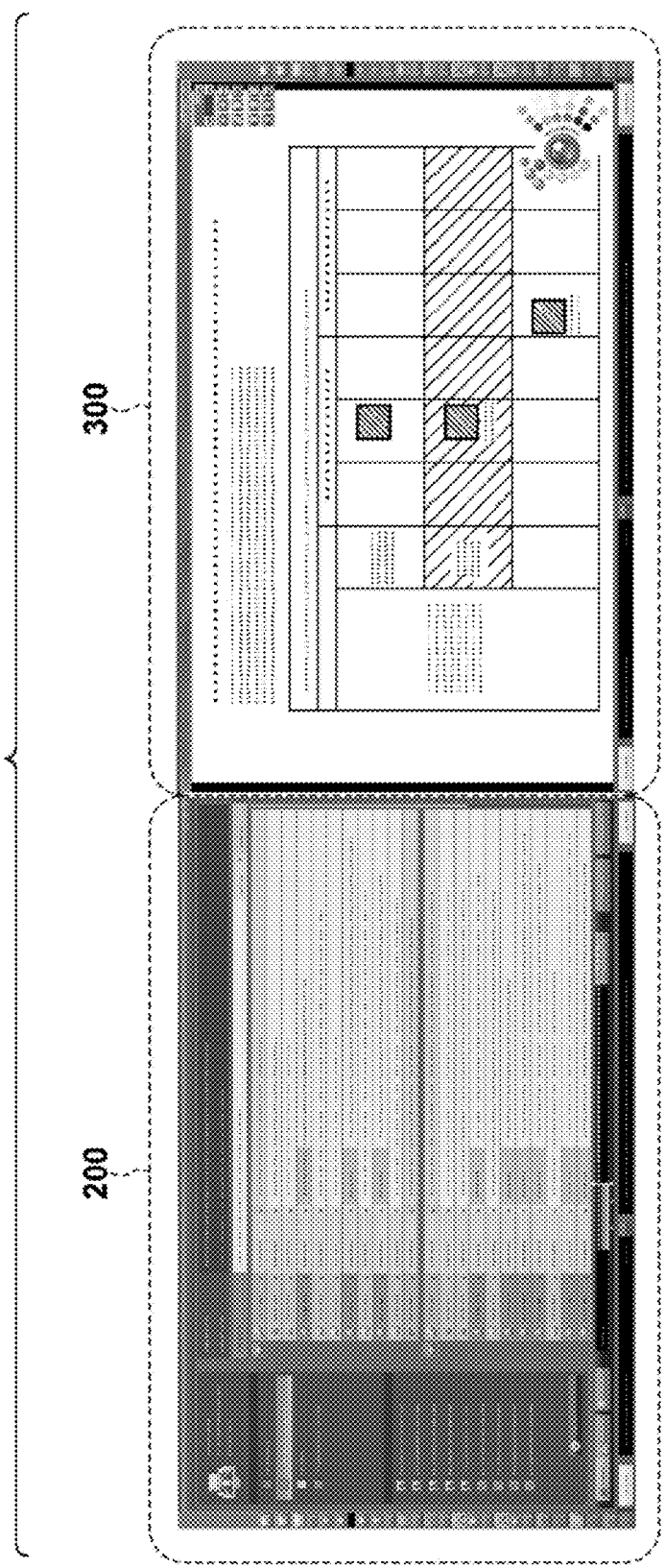
FIG. 2 is a view showing a display example of a conference support UI.
Figure 3:
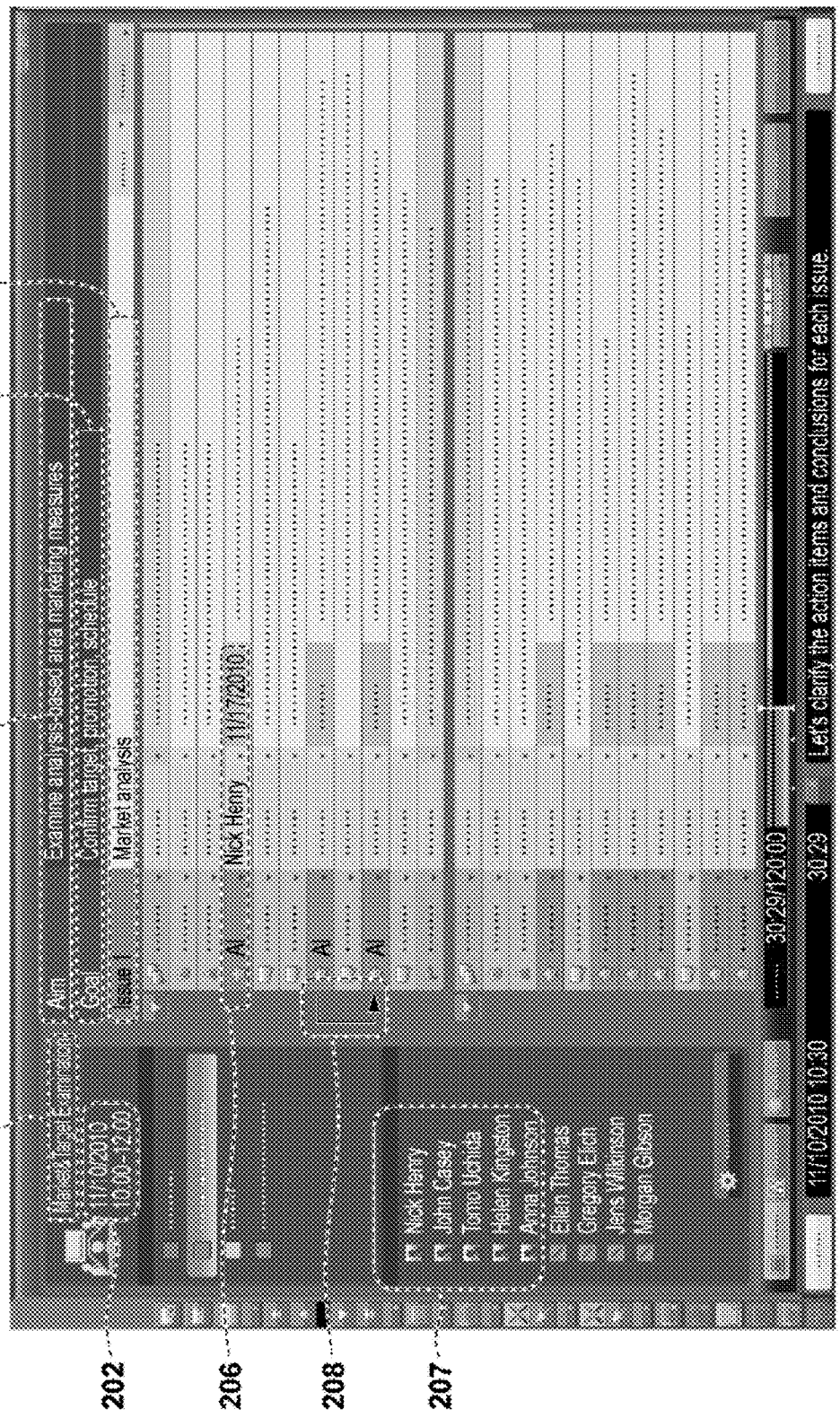
FIG. 3 is a view showing a configuration example of a conference minutes screen 200.

As shown in FIG. 2, the conference support UI according to this embodiment has a conference minutes screen 200 on its left side, and a whiteboard screen 300 on its right side. A configuration example of the conference minutes screen 200 will be explained using FIG. 3. As shown in FIG. 3, a conference name 201, a conference time 202, a conference purpose 203, a conference goal 204, participant information 207, a currently selected agenda 205, an action item 206, and the like are displayed on the conference minutes screen 200. It is possible to change the owner and due date of the action item 206 using the UI device 101. The conference minutes screen 200 is formed by arranging the above-mentioned various elements contained in the conference information 110.

A configuration example of the whiteboard screen 300 will be described next with reference to FIG. 4. The whiteboard screen 300 operates in synchronization with the conference minutes screen 200, and is used to display the above-mentioned various elements contained in the conference information 110 using character objects and graphic objects represented by the character/graphic data 120.

Figure 4:
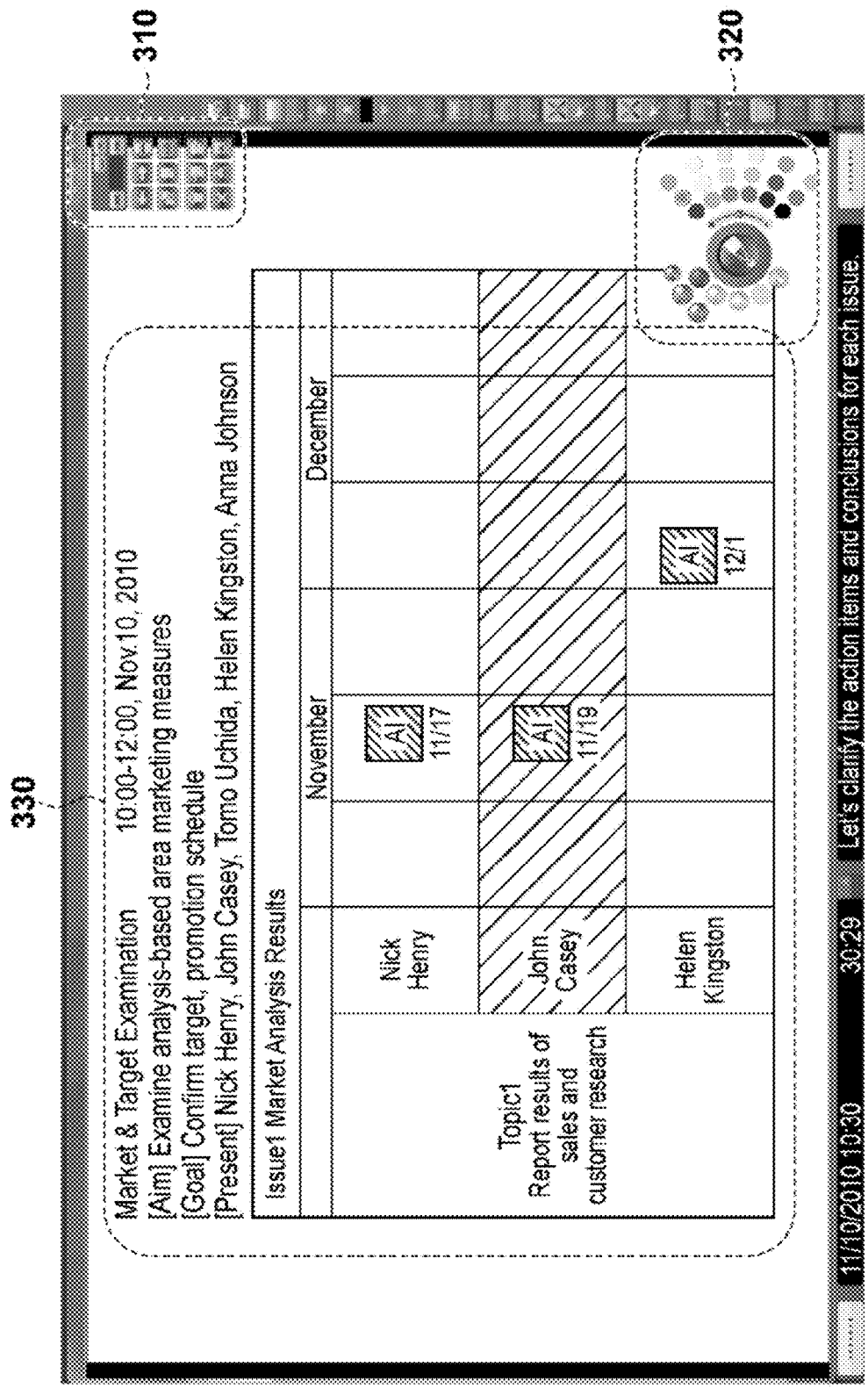
FIG. 4 is a view showing a configuration example of a whiteboard screen 300.

As shown in FIG. 4, the far-right portion of the whiteboard screen 300 includes a whiteboard menu 310 for selecting an edit function and a mode switching menu 320 for selecting one of various modes or a pen color/width. The central portion of the whiteboard screen 300 includes a template 330 pasted at the startup of the whiteboard screen 300. By operating the UI device 101, the user (in this case, a conference participant) can instruct the whiteboard menu 310 to select an edit function or instruct the mode switching menu 320 to select one of various modes or a pen color/width. With this operation, the user can place a character object or graphic object on the whiteboard screen 300, or can edit an already placed character object or graphic object.

Figure 5:
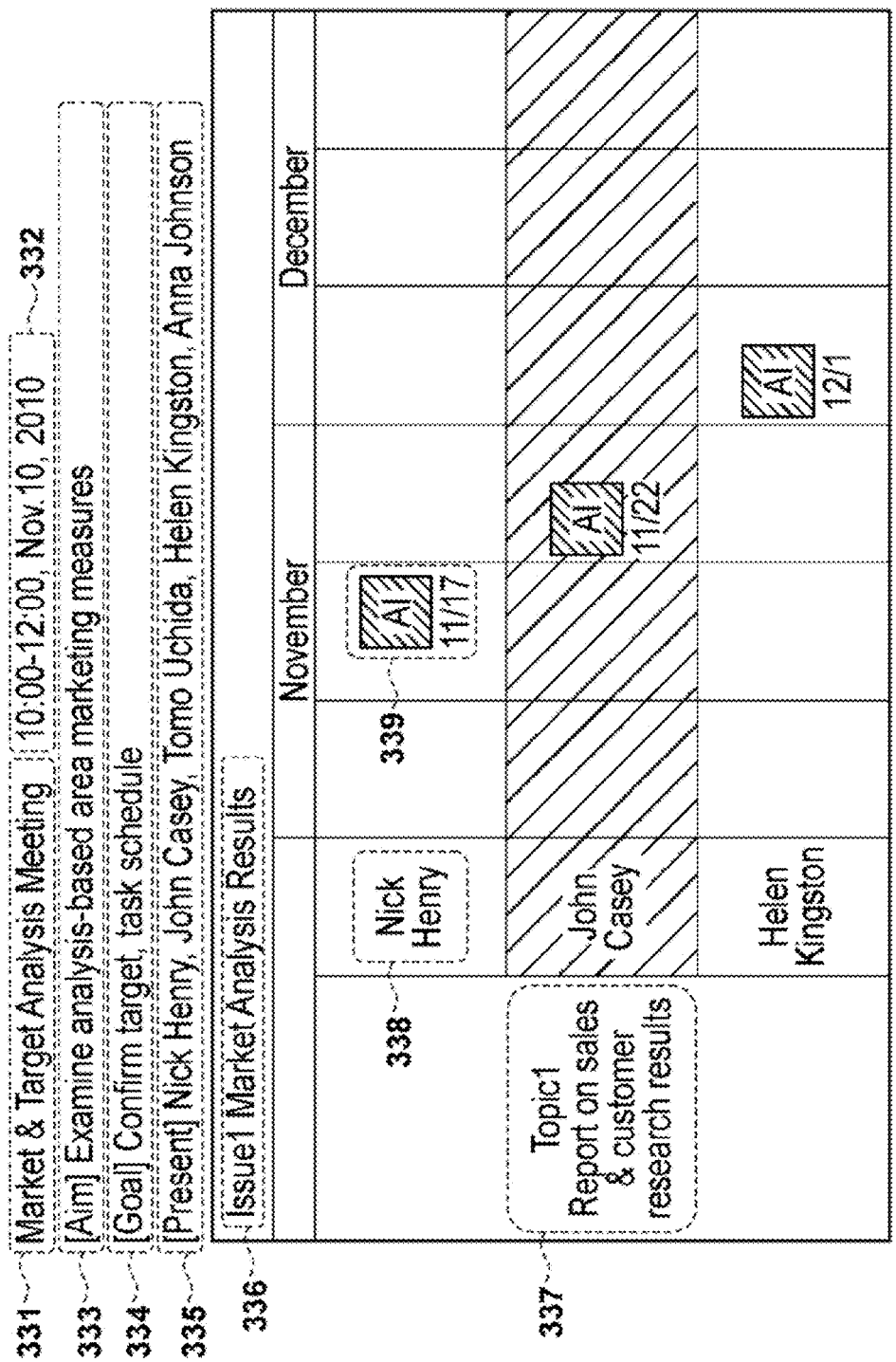
FIG. 5 is a view showing an example of a template 330.

FIG. 5 shows an example of the template 330. A conference name 331, a conference time 332, a conference purpose 333, a conference goal 334, participant information 335, an agenda 336 currently selected on the conference minutes screen 200 side, and a topic 337 are displayed as character objects on the whiteboard screen 300. All of the conference name 331, conference time 332, conference purpose 333, conference goal 334, participant information 335, agenda 336, and topic 337 have been read out from the conference information 110. The character objects corresponding to the readout information are arranged as shown in FIG. 5.

Furthermore, an action item owner 338 and action item due date 339 are displayed as graphic objects on the whiteboard screen 300. Both the owner 338 and due date 339 are read out from the conference information 110, and the graphic objects corresponding to the readout information are placed as shown in FIG. 5.

The user can use the UI device 101 to change or edit any of the character objects and graphic objects, as needed. Assume, for example, that the user operated the UI device 101, and instructed the mode switching menu 320 to select a graphic object selection mode. In this case, the CPU 102 permits processing associated with graphic objects such as processing of moving a graphic object using the UI device 101, and processing of changing the graphic object of the owner 338 to that of another owner.

Figure 10:
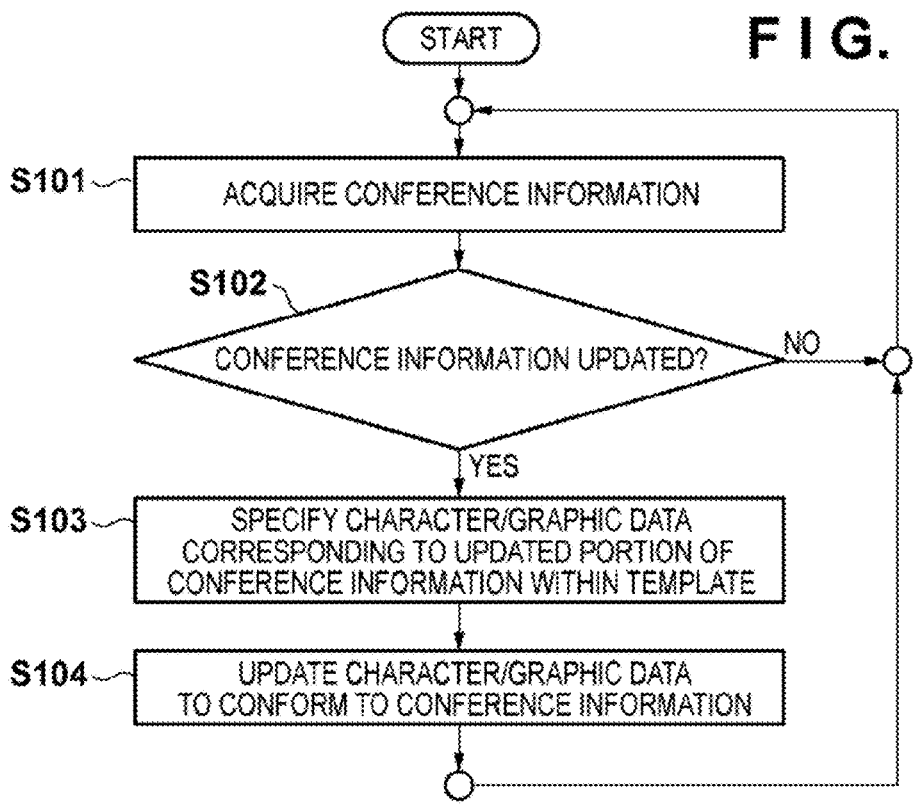
FIG. 10 is a flowchart illustrating processing executed when the conference information 110 is changed on the conference minutes screen 200.

Processing executed by the CPU 102 when the user changes the conference information 110 on the conference minutes screen 200 will be described with reference to FIG. 10 showing a flowchart for the processing. Note that a computer program which causes the CPU 102 to execute the processing according to the flowchart of FIG. 10 is stored in the program storage area 104. Therefore, the CPU 102 reads out the computer program into the RAM 103, and then executes it. This enables the conference support apparatus 100 to execute the processing according to the flowchart of FIG. 10.

In step S101, the CPU 102 acquires the conference information 110 into the RAM 103. In step S102, the CPU 102 determines whether the conference information 110 has been updated. Although there are various determination methods, a determination method is not particularly limited as long as it is possible to recognize an updated portion of the conference information 110. As a result of the determination process, if the information has been updated, the process advances to step S103; otherwise, the process ends.

In step S103, the CPU 102 specifies an object (a graphic object and/or a character object) corresponding to the updated portion (that is, an updated element in the conference information 110).

In step S104, the CPU 102 updates the object specified in step S103 with an object corresponding to the updated element. Assume, for example, that the user updates the owner of the action item 206 in FIG. 3 from "Nick Henry" to "Anna Johnson" using the UI device 101. In this case, in step S104, the CPU 102 updates the graphic object "Nick Henry" of the owner 338 shown in FIG. 5 with a graphic object 348 of "Anna Johnson", as shown in FIG. 6. Assume also that the user used the UI device 101 to update the due date "November 17" of the action item 206 in FIG. 3 with "December 10". In this case, in step S104, the CPU 102 moves/changes the character/graphic object of the due date 339 in FIG. 5 to obtain a graphic object 349, as shown in FIG. 6.

Figure 11:
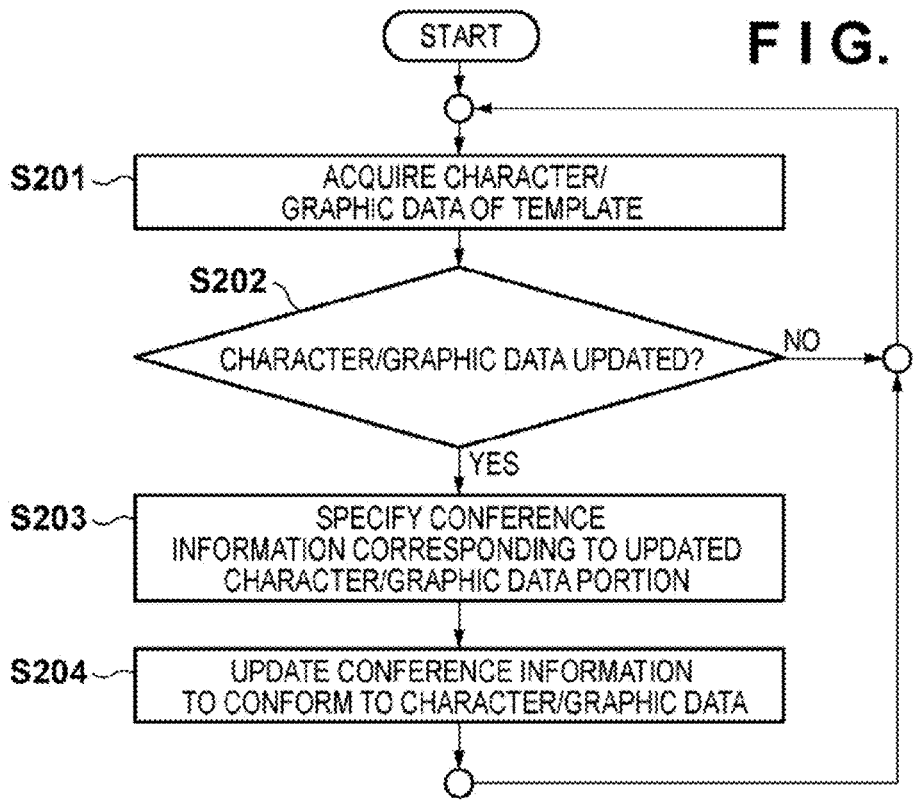
FIG. 11 is a flowchart illustrating processing executed when objects are changed on the whiteboard screen 300.

Processing executed by the CPU 102 when the user changes a character object or graphic object on the whiteboard screen 300 will be described with reference to FIG. 11 showing a flowchart for the processing. Note that a computer program which causes the CPU 102 to execute the processing according to the flowchart of FIG. 11 is stored in the program storage area 104. Therefore, the CPU 102 reads out the computer program into the RAM 103, and then executes it. This enables the conference support apparatus 100 to execute the processing according to the flowchart of FIG. 11.

In step S201, the CPU 102 acquires character objects and graphic objects contained in a template (the template 330 in FIG. 4). In step S202, the CPU 102 determines whether each of the acquired objects has been changed. As a result of the determination process, if there is a change, the process advances to step S203; otherwise, the process ends.

In step S203, the CPU 102 specifies an element within the conference information 110 corresponding to the changed object. In step S204, the CPU 102 changes the specified element to contents corresponding to the changed object. According to the changed conference information 110, the display of the conference minutes screen 200 is also changed, as a matter of course.

Assume, for example, that the user used the UI device 101 to select the graphic object of the owner 338 in FIG. 5, and then changed a character string written on the graphic object from "Nick Henry" to "Anna Johnson". In this case, in step S204, the owner name of the action item 206 in FIG. 3 is also changed from "Nick Henry" to "Anna Johnson". Correspondingly, the conference information 110 is also changed, as a matter of course. If the user moves/changes the graphic object of the due date 339 in FIG. 5 to obtain the graphic object 349 in FIG. 6 using the UI device 101, the due date of the action item 206 in FIG. 3 is also changed from "November 17" to "December 10" in step S204. Correspondingly, the conference information 110 is also changed, as a matter of course.

In this embodiment, if one of an element of interest and an object corresponding to the element of interest is detected to have been updated, the other is also updated according to the update operation. As long as an UI with another configuration can implement this function, it may be applied instead of the conference support UI.

If the user uses the UI device 101 to add an arrow pointing another action item like a graphic object 350, the conference information 110 reflects information indicating that those action items are related to each other. Since the graphic object 350 has a single-headed arrow, a dependency relation such that the December 1 action item needs to be completed after the November 22 action item is completed is stored. On the conference minutes screen 200 of FIG. 3, such a dependency relation between action item rows may be explicitly indicated by an arrow graphic 208.

If the user uses the UI device 101 to circle an action item like a graphic object 351, the conference information 110 reflects information indicating that this action item is important. On the conference minutes screen 200 of FIG. 3, such an important action item row may be explicitly represented by changing its background color.

Second Embodiment

Figure 7:
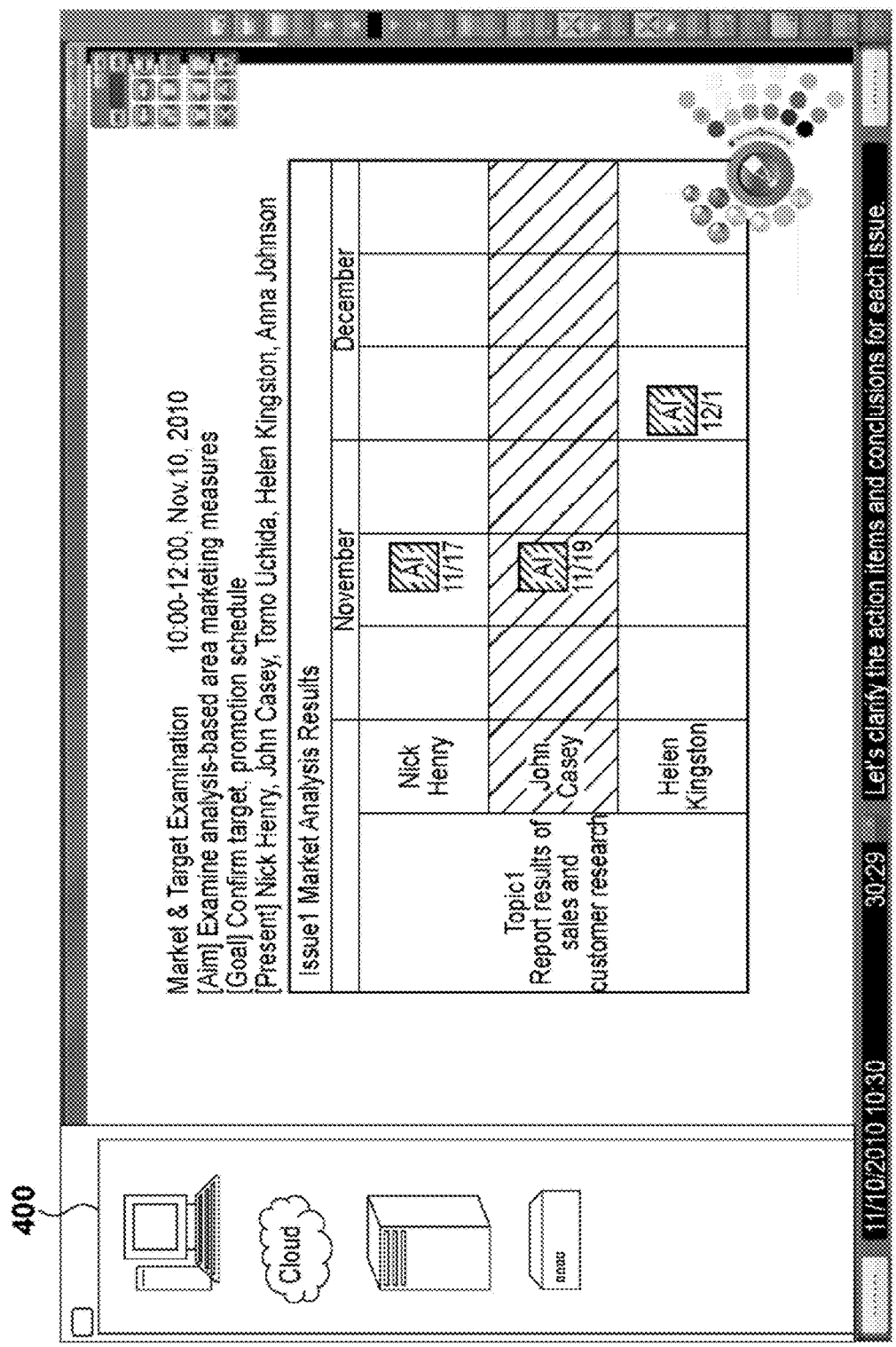
FIG. 7 is a view showing a display example of a whiteboard screen 300.

As shown in FIG. 7, on the left side of a whiteboard screen 300, a stencil list 400 may be displayed according to a conference type. Note that stencils are arranged from the top in the descending order of frequency of use which has been determined based on the contents of a conference.

In the example of FIG. 7, since a conference associated with a network is held, the stencils of a personal computer and network apparatuses are displayed in the stencil list 400. The user can drag and drop a target stencil from the stencil list 400 to paste it on a display area (whiteboard) on the right side using a UI device 101.

Figure 12:
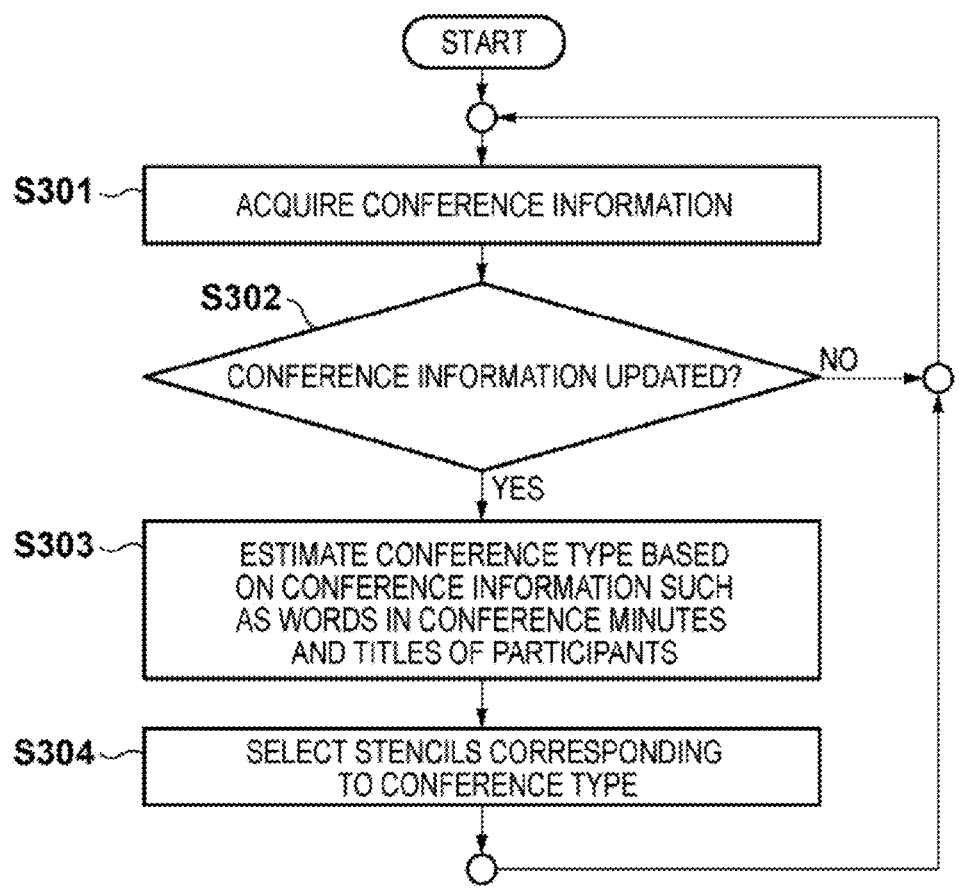
FIG. 12 is a flowchart illustrating processing when conference information 110 is changed on a conference minutes screen 200.

Processing executed by a CPU 102 when the user changes conference information 110 on a conference minutes screen 200 will be described with reference to FIG. 12 showing a flowchart for the processing. Note that a computer program which causes the CPU 102 to execute the processing according to the flowchart of FIG. 12 is stored in a program storage area 104. Therefore, the CPU 102 reads out the computer program into a RAM 103, and then executes it. This enables a conference support apparatus 100 to execute the processing according to the flowchart of FIG. 12.

In step S301, the CPU 102 acquires the conference information 110 into the RAM 103. In step S302, the CPU 102 determines whether the conference information 110 has been updated. Steps S301 and S302 are performed similarly to steps S101 and S102, respectively. As a result of the determination process, if the information has been updated, the process advances to step S303; otherwise, the process ends.

In step S303, the CPU 102 estimates a conference type based on elements contained in the conference information 110, for example, appearing words such as words in conference minutes and the titles of conference participants. This estimation operation is done as follows. That is, for each conference type, a dictionary registering appearing words which should be contained in the conference information 110 to estimate the type is registered in a data storage area 105 in advance. Using the dictionary, the CPU 102 estimates a conference type corresponding to the appearing words contained in the conference information 110.

In step S304, among stencil list data registered in advance in the data storage area 105 for each conference type, the CPU 102 reads out, into the RAM 103, stencil list data corresponding to the type estimated in step S303. The CPU 102 arranges, from the top, the icons of stencils in a stencil list indicated by the readout stencil list data in the descending order of the frequency of use on the left side of the whiteboard screen 300. The display position and format of the stencil list is not particularly limited.

Figure 8:
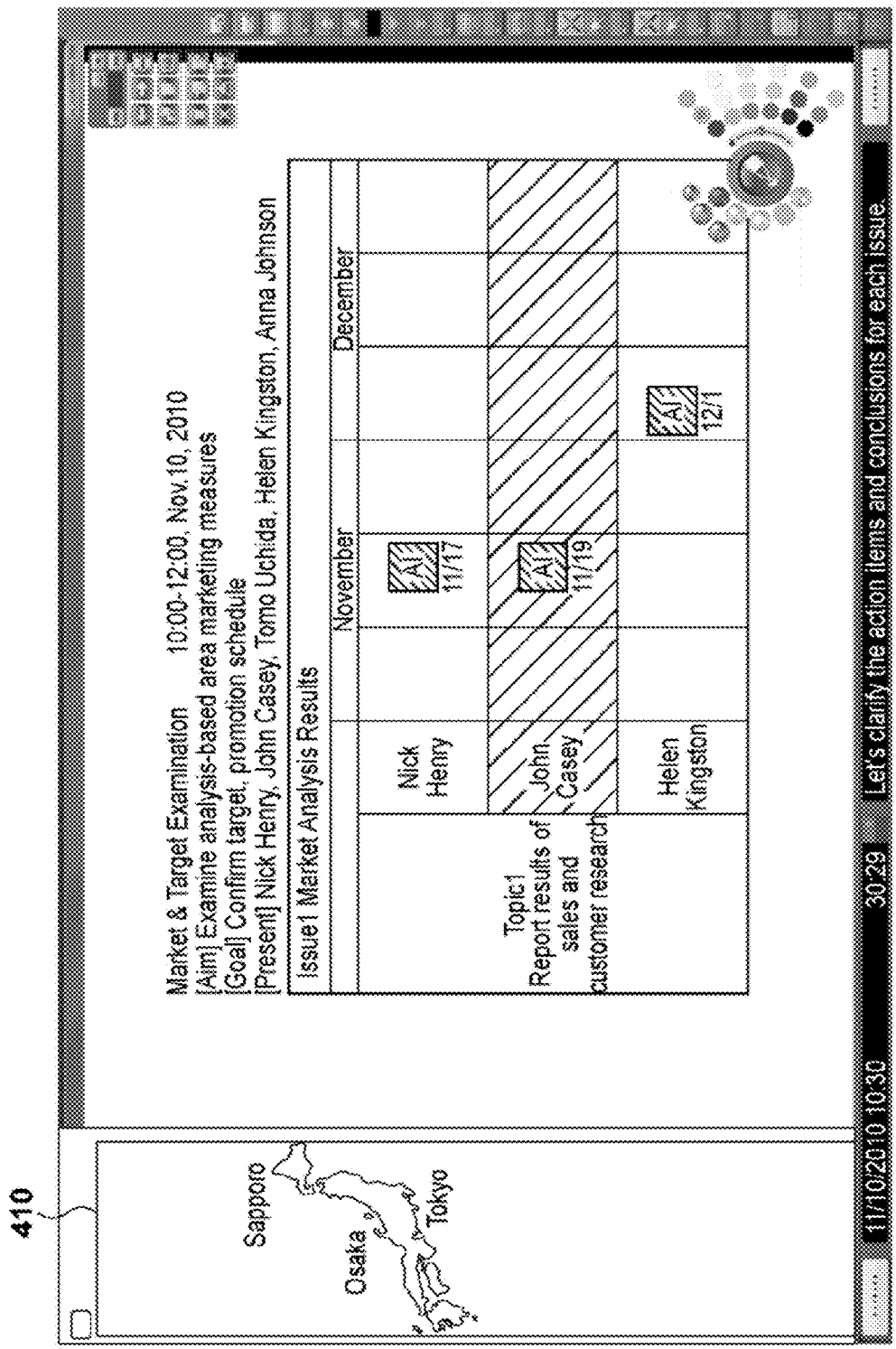
FIG. 8 is a view showing a display example of the whiteboard screen 300.

In addition to arranging stencils prepared in advance, it is possible to place stencils some of which have been changed in accordance with the contents of a conference like a stencil list 410, as shown in FIG. 8. In the example of FIG. 8, the stencil of a blank map on which place names mentioned in the conference are written is displayed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-192710 filed Aug. 30, 2010, which is hereby incorporated by reference herein in its entirety.

What is claimed is:

1. An information processing, comprising:
   one or more hardware processors; and
   one or more memories which store instructions executable by the one or more hardware processors to cause the information processing apparatus to perform at least:
   acquiring minutes data;
   determining a meeting type based on the acquired minutes data;
   selecting, based on the determined meeting type, at least one object image to be displayed on a display screen among a plurality of object images;
   displaying, on a first display area in the display screen, the at least one selected object image;
   displaying, on a second display area in the display screen, an object image which is designated by a user operation among the at least one selected object image which is displayed on the first display area in the display screen; and
   storing the acquired minutes data with object data corresponding to the object image which is displayed on the second display area in the display screen.

2. The apparatus according to claim 1, wherein the instructions further cause the information processing apparatus to perform:
   determining, based on a designation frequency of the at least one object image which is selected based on the minutes data, a display position of the selected object image on the first display area in the display screen.

3. The apparatus according to claim 1, wherein the instructions further cause the information processing apparatus to perform:
   changing, based on further acquiring of minutes data, the at least one object image which have been displayed on the first display area in the display screen.

4. The apparatus according to claim 1, wherein the instructions further cause the information processing apparatus to perform:
   storing character information related to minutes data and an object image in correspondence with each other, and
   wherein the object image corresponding to the character information included in the acquired minutes data is selected as the at least one object image to be displayed on the display screen.

5. The apparatus according to claim 1, wherein the in a case where a place name is included in the acquired minutes data, at least one map object image corresponding to the place name is selected among the plurality of object images, and is displayed on the first display area in the display screen.

6. The apparatus according to claim 1, wherein the instructions further cause the information processing apparatus to perform:
   receiving user operation information related to a user operation to the display screen for designating the object image.

7. The apparatus according to claim 1, wherein information according to the acquired minutes data is displayed with the object image designated by the user operation on the second display area.

8. The apparatus according to claim 1, wherein the plurality of object images are stored in the information processing apparatus before the acquiring of the minutes data.

9. The apparatus according to claim 1, wherein the object image designated by the user operation is displayed at a position in the second display area designated by the user operation.

10. The apparatus according to claim 1, wherein the meeting type is determined based on at least one of information of conference participants included in the acquired minutes data.

11. An information processing method, comprising:
   acquiring minutes data;
   determining a meeting type based on the acquired minutes data;
   selecting, based on the determined meeting type, at least one object image to be displayed on a display screen among a plurality of object images;
   displaying, on a first display area in the display screen, the at least one selected object image;
   displaying, on a second display area in the display screen, an object image which is designated by a user operation among the at least one selected object image which is displayed on the first display area in the display screen; and
   storing the acquired minutes data with object data corresponding to the object image which is displayed on the second display area in the display screen.

12. The method according to claim 11, further comprising:
   determining, based on a designation frequency of the at least one object image which is selected based on the acquired minutes data, a display position of the selected object image on the first display area in the display screen.

13. The method according to claim 11, further comprising:
   changing, based on further acquiring of minutes data, the at least one object image which have been displayed on the first display area in the display screen.

14. A non-transitory computer-readable storage medium storing a computer program for causing a computer to perform the functions of:
   acquiring minutes data;
   determining a meeting type based on the acquired minutes data;
   selecting, based on the determined meeting type, at least one object image to be displayed on a display screen among a plurality of object images;
   displaying, on a first display area in the display screen, the at least one selected object image;
   displaying, on a second display area in the display screen, an object image which is designated by a user operation among the at least one selected object image which is displayed on the first display area in the display screen; and
   storing the acquired minutes data with object data corresponding to the object image which is displayed on the second display area in the display screen.

15. The medium according to claim 14, wherein the computer program further causes the computer to perform the function of:
   determining, based on a designation frequency of the at least one object image which is selected based on the minutes data, a display position of the selected object image on the first display area in the display screen.

16. The medium according to claim 14, wherein the computer program further causes the computer to perform the function of:
   changing, based on further acquiring of minutes data, the at least one object image which have been displayed on the first display area in the display screen.

* * * * *